(12) United States Patent
Kincses et al.

(10) Patent No.: US 9,957,005 B2
(45) Date of Patent: May 1, 2018

(54) FASTENING DEVICE AND LOCKING DEVICE

(71) Applicant: Dürr Systems GmbH, Bietigheim-Bissingen (DE)

(72) Inventors: Michael Kincses, Stuttgart (DE); Edgar Blum, Grebenhain (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days. days.

(21) Appl. No.: 14/890,730

(22) PCT Filed: Apr. 23, 2014

(86) PCT No.: PCT/EP2014/058250
§ 371 (c)(1),
(2) Date: Nov. 12, 2015

(87) PCT Pub. No.: WO2014/183965
PCT Pub. Date: Nov. 20, 2014

(65) Prior Publication Data
US 2016/0096567 A1    Apr. 7, 2016

(30) Foreign Application Priority Data
May 15, 2013    (DE) .......................... 10 2013 209 038

(51) Int. Cl.
*B62D 65/18*    (2006.01)
(52) U.S. Cl.
CPC .................................... *B62D 65/18* (2013.01)

(58) Field of Classification Search
CPC ....................................................... B62D 65/18
USPC .......................................................... 269/56
See application file for complete search history.

(56) References Cited

U.S. PATENT DOCUMENTS

| | | | |
|---|---|---|---|
| 6,372,107 B1 * | 4/2002 | Besinger | B05C 3/10 |
| | | | 204/479 |
| 8,157,079 B2 * | 4/2012 | Assmann | B62D 65/18 |
| | | | 198/345.1 |
| 9,193,542 B2 * | 11/2015 | Covizzi | B05C 3/10 |
| 2003/0000413 A1 * | 1/2003 | Arai | B62D 65/18 |
| | | | 104/89 |

FOREIGN PATENT DOCUMENTS

| | | |
|---|---|---|
| DE | 100 02 481 | 8/2001 |
| DE | 20 2006 011 130 | 10/2006 |
| EP | 0 691 261 | 1/1996 |
| FR | 2 592 637 | 7/1987 |
| WO | WO 2012/146487 | 11/2012 |

* cited by examiner

*Primary Examiner* — Marc Carlson
(74) *Attorney, Agent, or Firm* — Womble Bond Dickinson (US) LLP

(57) ABSTRACT

In order to provide a fastening device for fastening a workpiece (104) to a moving device (116) for moving the workpiece, this fastening device having a small space requirement and enabling the workpiece to be securely fastened to the moving device, it is proposed that the fastening device should include a receiving element (110) for receiving the workpiece and a locking device (122) for releasably fixing the receiving element on the moving device.

15 Claims, 8 Drawing Sheets

FASTENING DEVICE AND LOCKING DEVICE

CROSS-REFERENCE TO RELATED APPLICATIONS

The present application is a U.S. National Stage of International Patent Application PCT/EP2014/058250 filed on Apr. 23, 2014, and claims priority to German Patent Application No. 10 2013 209 038.2 filed on May, 15, 2013. The disclosures of each of the applications noted above are incorporated herein by reference in their entirety.

FIELD OF THE DISCLOSURE

The present invention relates to a fastening device for fastening a workpiece to a moving device for moving the workpiece.

BACKGROUND

In principle, a workpiece may be fastened directly to the moving device.

SUMMARY OF THE INVENTION

The object of the present invention is to provide a fastening device which has a small space requirement and enables the workpiece to be securely fastened to a moving device.

According to the invention, this object is achieved by a fastening device for fastening a workpiece to a moving device for moving the workpiece, in which the fastening device includes a receiving element for receiving the workpiece and a locking device for releasably fixing the receiving element on the moving device.

Because the fastening device includes a receiving element and a locking device, the workpiece can be securely fastened to a moving device while having a small space requirement.

It may be favourable if the locking device for releasably fixing the receiving element is directly engageable with the receiving element.

For example, it may be provided for the receiving element to include a bearing surface by means of which the receiving element and a workpiece arranged thereon are configured to bear against a conveying device and/or to be supported on a conveying device, for conveying the receiving element and the workpiece arranged thereon in a conveying direction.

It may be favourable if, for releasably fixing the receiving element on the moving device, the locking device is engageable with a portion of the bearing surface of the receiving element.

It may be advantageous if, in a locking position, the locking device acts on a portion of the receiving element, in particular on the bearing surface of the receiving element, and/or engages behind a portion of the receiving element, in particular a portion of the bearing surface of the receiving element.

A bearing surface is in particular a support surface.

It may be favourable if the locking device is a gripping device for grasping the receiving element. By means of a gripping device of this kind, the receiving element is fixable in relation to the moving device preferably in respect of at least two directions in space, in particular in respect of all three directions in space.

In one embodiment of the invention, for conveying the receiving element and a workpiece arranged thereon in a conveying direction by means of a bearing surface, it is provided for the receiving element to be configured to bear against a conveying device, and, for releasably fixing the receiving element on the moving device, for the locking device to be engageable with the receiving element by a movement in a positioning direction of the locking device that is oriented substantially perpendicular to the bearing surface of the receiving element.

In particular, it may be provided, for releasably fixing the receiving element on the moving device, for the receiving element and the locking device to be engageable in relation to one another, in particular by a movement of the receiving element and/or by a movement of the locking device in the positioning direction.

As a result of a movement in the positioning direction, the locking device is preferably movable from a rest position into an operative position.

In particular in the operative position, the locking device is preferably movable into a locking position, in which a locking element of the locking device engages with the receiving element, and into an open position, in which the receiving element is movable in relation to the locking element.

A positioning direction is in particular a direction of application in which the locking device acts on the receiving element, for releasably fixing the receiving element.

As an alternative or in addition thereto, it may be provided for the positioning direction to be a direction of engagement in which the locking device and/or a locking element of the locking device is movable in relation to the receiving element in order for the locking device and/or the locking element to engage with the receiving element.

In particular if, for moving from the rest position into the operative position, the receiving element and/or the locking device are rotated or pivoted, it may be provided for the positioning direction to be the direction which, in the end location in the operative position, is oriented tangentially to the direction of rotation.

It may be advantageous if, for releasably fixing the receiving element, the locking device is engageable with a portion of the receiving element that, during conveying of the receiving element and a workpiece arranged thereon, bears against a conveying device, in particular being supported on the conveying device.

Preferably, the receiving element and the workpiece arranged thereon are conveyed along a substantially linear path of movement. Thus, the conveying direction is preferably substantially linear.

Movement by means of the moving device is preferably different from the movement in the conveying direction. In particular, it may be provided for the movement by means of the moving device to be a rotary movement or a combination of a rotary movement and a linear movement.

In one embodiment of the invention, it is provided for the fastening device to include at least two receiving elements.

Preferably, the at least two receiving elements are connected to one another by means of the workpiece, in particular being connected to one another exclusively by means of the workpiece.

Further, it may be provided for the fastening device to include at least two locking devices.

Preferably, a respective receiving element is fixable in relation to the moving device by means of in each case at least one locking device.

In particular, it may be provided for the fastening device to include at least two receiving elements and at least two locking devices, wherein the at least two receiving elements are connected to one another by means of the workpiece, and wherein a respective receiving element is fixable in all three directions in space in relation to the moving device by means of in each case at least one locking device.

It may be provided for a receiving element to be fixable with positive engagement by means of the locking device.

In this description and the attached claims, use of the singular should not be understood as being restrictive. Rather, it may be provided for the fastening device to include for example a plurality of receiving elements and/or a plurality of locking devices, or for a plurality of workpieces to be arranged on (at least) one receiving element, or for a plurality of moving devices to be provided.

In one embodiment of the invention, it is provided for the receiving element to take a substantially rail-shaped form.

In particular, it may be provided for the receiving element to include a double T-s shaped beam, or at least in certain regions to take the form of a double T-shaped beam.

A double T-shaped beam is in particular an I-shaped beam.

A double T-shaped beam preferably includes two substantially mutually parallel flat end regions which are connected to one another by means of a web region. Consequently, the cross section is substantially I-shaped.

It may be advantageous if, for releasably fixing the receiving element on the moving device, the locking device acts on one or both of the mutually parallel flat end regions and/or on the web region.

It may be provided for one or both of the mutually parallel flat end regions and/or the web region to include or have one or more recesses, indentations and/or openings in which at least one locking element of the locking device can engage.

As an alternative or in addition thereto, it may be provided for one or both of the mutually parallel flat end regions and/or the web region to include or have one or more projections with which at least one locking element of the locking device is engageable.

It may be favourable if the locking device includes a movable locking element which is engageable behind at least one portion of the receiving element in a locking position of the locking device.

At least one portion of the receiving element is preferably surrounded in the locking position, on two mutually opposite sides of the portion of the receiving element, by the locking device, in particular by a locking element or two locking elements of the locking device.

Preferably, it is provided, in the locking position of the locking device, for at least one movable locking element to engage behind one or both of the mutually parallel flat end regions and/or the web region of a double T-shaped beam.

In one embodiment of the invention, it is provided for the locking device to include a locking element which is engageable with an indentation, opening and/or recess in the receiving element.

The locking element may take a movable or immovable form.

For example, the locking element may take the form of an immovable securing element, for example a blade or a bar.

By means of an in particular immovable locking element, the receiving element may preferably be locked in respect of at least one direction running perpendicular to the positioning direction.

The expression "movable or immovable locking element of the locking device" is to be understood in particular as a locking element which takes a form that is respectively movable or immovable in relation to further elements of the locking device, in particular in relation to the elements of the locking device that are fixed in relation to the moving device.

A locking element that is movable only together with the entire locking device is thus preferably an immovable locking element.

It may be favourable if the locking element is movable in particular separately or together with further elements or all the elements of the locking device.

It may be provided for the locking element to be movable in relation to the receiving element and/or in relation to the moving device and/or in relation to a further movable or immovable locking element.

The locking device preferably includes a pivotal and/or linearly movable locking element which is preferably engageable with the receiving element.

The locking element is preferably pivotal and/or linearly movable in relation to a receiving element and/or in relation to the moving device and/or in relation to one or further locking elements of the locking device.

The pivotal and/or linearly movable locking element is preferably engageable with one or both of the mutually parallel flat end regions and/or with the web region of a double T-shaped beam of a receiving element.

It may be favourable if the locking device includes a locking element that is pivotal about an axis, in particular a pivot axis, that runs substantially perpendicular to a positioning direction of the locking device.

In particular if the receiving element takes the form of a double T-shaped beam or includes a double T-shaped beam, it may be provided for the axis about which the locking element of the locking device is pivotal to run at least approximately parallel or perpendicular to a longitudinal direction of the double T-shaped beam.

A longitudinal direction of the double T-shaped beam is the direction that runs perpendicular to a cross sectional plane, wherein a cross section of the double T-shaped beam in the cross sectional plane is substantially I-shaped.

The axis about which a locking element is pivotal, and/or the longitudinal direction of a double T-shaped beam, is/are preferably substantially parallel to the conveying direction, provided the receiving element and the workpiece arranged thereon are arranged on the conveying device.

It may be advantageous if the locking device includes an actuating device for actuating a locking element.

In particular, it may be provided for the locking device to include an actuating device that includes an eccentric device and/or a cam device, in particular a guideway device, for actuating a locking element of the locking device.

It may be advantageous if the locking device includes a plurality of locking elements that are actuable by means of the actuating device, in particular by means of the eccentric device and/or the cam device.

Preferably, the locking device includes an actuating device for actuating a locking element of the locking device, wherein the actuating device includes an actuating element for actuating the locking element, by means of which the locking element is optionally movable into a locking position, in which the locking element engages with the receiving element, and into an open position, in which the receiving element is movable in relation to the locking element.

Further, it may be provided for the locking device to include a blocking device by means of which an undesired movement of the locking element from a locking position, in which the locking element engages with the receiving element, into an open position, in which the receiving element is movable in relation to the locking element, and/or from the open position into the locking position, is blockable.

Preferably, the blocking device includes an eccentric device and/or a cam device.

In particular, it may be provided for the actuating device and the blocking device to be formed by a common eccentric device and/or a common cam device.

The eccentric device may include eccentrically mounted actuating elements and/or eccentrically mounted blocking elements.

It may be favourable if at least one eccentrically mounted actuating element, at least one eccentrically mounted blocking element and/or a drive element, for driving the actuating device and/or the blocking device, are arranged on a common shaft.

It may be provided for the receiving element to be releasably fixable in relation to the moving device by means of at least one locking element in respect of a first direction in space and in respect of a second direction in space that is substantially perpendicular to the first direction in space.

Further, it may be provided for the receiving element to be releasably fixable in relation to the moving device by means of at least one locking element in respect of all three directions in space oriented substantially perpendicular to one another.

In a preferred embodiment, it is provided for the locking device to include at least two locking elements, wherein the receiving element is releasably fixable in relation to the moving device by means of at least one locking element in respect of a first direction in space and in respect of a second direction in space that is substantially perpendicular to the first direction in space, and wherein the receiving element is releasably fixable in relation to the moving device by means of at least one further locking element in respect of a third direction in space that is substantially perpendicular to the first direction in space and the second direction in space.

In particular, it may be provided for the receiving element to be fixable with positive engagement by means of the at least two locking elements.

It may be favourable if the receiving element is releasably fixable in relation to the moving device by means of at least one locking element in respect of the third direction in space by engagement in a hollow, opening and/or recess in the receiving element.

The fastening device according to the invention is suitable in particular for use in a conveying facility for conveying workpieces.

For this reason, the invention also relates to a conveying facility for conveying workpieces.

In this respect, the object of the invention is to provide a conveying facility for conveying workpieces in which a workpiece is securely and releasably fixable on a moving device while having a small space requirement.

According to the invention, this object is achieved in that the conveying facility for conveying workpieces includes the following:
 a fastening device according to the invention;
 a moving device for moving a workpiece; and
 a conveying device by means of which the workpiece that is arranged on a receiving element of the fastening device is conveyable.

The conveying facility according to the invention preferably has individual or a plurality of the features and/or advantages described in the context of the fastening device according to the invention.

In the case of the conveying facility according to the invention, the locking device is preferably arranged on the moving device, in particular being fixed on the moving device.

Further, the present invention relates to a locking device.

In this respect, the object of the invention is to provide a locking device by means of which an element to be locked can be securely fastened while having a small space requirement.

According to the invention, this object is achieved by a locking device which includes a locking element and an actuating device that includes an eccentric device and/or a cam device, in particular a guideway device, for actuating the locking element, wherein the locking element is movable, by means of the actuating device, optionally into a locking position, in which the locking element engages with an element to be locked, and into an open position, in which the element to be locked is movable in relation to the locking element.

The locking device according to the invention preferably has individual or a plurality of the features and/or advantages described in the context of the fastening device according to the invention and/or the conveying facility according to the invention.

It may be advantageous if the element to be locked is a receiving element for receiving a workpiece.

In one embodiment of the invention, it is provided for the locking device to include a blocking device by means of which undesired movement of the locking element from the locking position into the open position, and/or from the open position into the locking position, is blockable.

The blocking device includes in particular an eccentric device and/or a cam device, in particular a guideway device.

It may be provided for the actuating device and the blocking device to include a common eccentric device and/or a common cam device, in particular a guideway device.

The locking device according to the invention is in particular usable in the fastening device according to the invention and/or in the conveying facility according to the invention.

Further, the fastening device according to the invention, the conveying facility according to the invention and/or the locking device according to the invention may have individual or a plurality of the features and/or advantages described below:

It may be provided for the receiving element to include a projection, a protrusion and/or an additional element that is engageable with the locking device for releasably fixing the receiving element to the moving device.

For example, it may be provided for a receiving element or two receiving elements to be provided, for jointly receiving a workpiece, with pins which are engageable with a hook that is arrangeable and/or arranged on the moving device. In particular, it may be provided for the pins to be capable of being embraced by hooks.

A receiving element may for example take the form of a so-called ski bar.

As an alternative thereto, it may be provided for a receiving element to take the form of a so-called skid.

Preferably, all the elements and portions of the receiving element with which the locking device is engageable are integrated within a cross section of the receiving element, in particular in a cross section of a double T-shaped beam of a receiving element, for example a skid bar. This results in a particularly small space requirement.

It may be provided for at least one locking element to be movable from the open position into the locking position and/or from the locking position into the open position by actuating, in particular rotating, for example by 90° or 180°, at least one eccentrically mounted actuating element and/or at least one eccentrically mounted blocking element.

In this arrangement, one or two locking elements may be associated with for example a respective actuating element and/or a respective blocking element.

For rotating the at least one eccentrically mounted actuating element and/or the at least one eccentrically mounted blocking element, a drive element is preferably is provided. The drive element may be actuated by an actuator, for example for rotation by 90°. For rotation by 180°, the drive element is preferably actuated by two actuators one after the other.

An axis of rotation of the drive element is preferably substantially perpendicular or parallel to the positioning direction.

In a further embodiment of the fastening device and/or the locking device, a cam device, an eccentric device and/or an external drive may be provided in order to move, for example to press together or push apart, at least one locking element, in particular to move it into an open position and/or a locking position.

The fastening device is preferably self-locking in order as far as possible to prevent it from opening by itself.

The receiving element is releasably fixed on the moving device preferably by positive engagement and/or by force locking, by means of the locking device.

The fastening device according to the invention enables in particular simple mechanical bolting and/or simple mechanical bolt actuation.

The fastening device according to the invention, the conveying facility according to the invention and/or the locking device according to the invention may be used in particular in conjunction with testing stations and/or coating facilities, in particular dip-coating facilities.

In principle, the locking device according to the invention is suitable for all cases in which workpieces, in particular vehicle bodies, are placed and/or releasably fixed on receiving elements and/or moving devices.

The conveying facility may in this case be a roller conveying facility or an overhead conveyor facility, for example a UBS suspension facility.

Further preferred features and/or advantages of the invention form the subject matter of the description below and the illustration in the drawings of exemplary embodiments.

BRIEF DESCRIPTION OF THE DRAWINGS

In the drawings.

Like or functionally equivalent elements are designated by the same reference numerals in all the Figures.

DETAILED DESCRIPTION OF THE INVENTION

Figure 1:
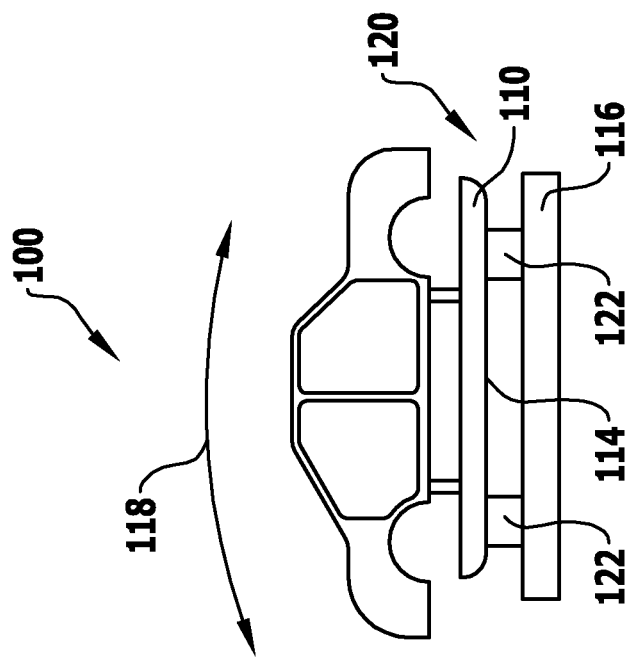
FIG. 1 shows a schematic side view of a conveying facility for conveying workpieces, in particular vehicle bodies.
Figure 1:
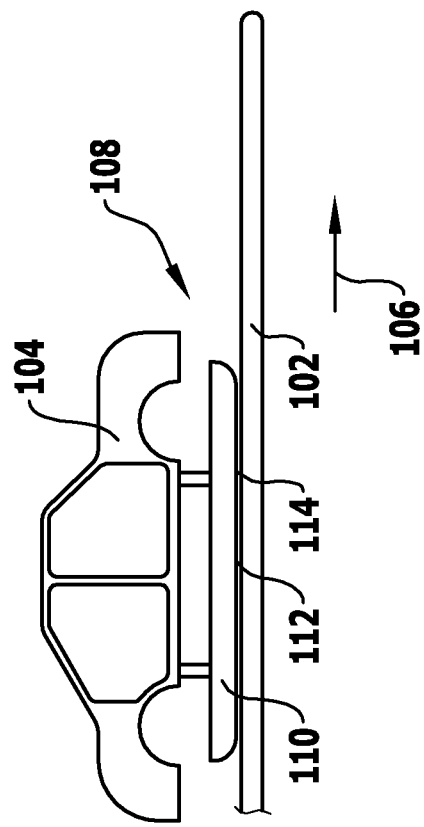

A conveying facility that is illustrated in FIGS. 1 to 5 and is designated 100 as a whole includes a conveying device 102 for conveying workpieces 104, in particular vehicle bodies, in a conveying direction 106.

For this purpose, the workpieces 104 are receivable by means of a workpiece receptacle 108.

In particular, the workpiece receptacle 108 may in this case be formed by two receiving elements 110.

The receiving elements 110 are arranged on the workpiece 104, in particular substantially in the shape of runners, and for this reason are for example designated "ski bars".

As an alternative to a workpiece receiver 108 of this kind, the use of so-called skids may also be provided.

For conveying the workpieces 104 by means of the conveying device 102, the workpiece 104, together with the receiving elements 110, may be placed on the conveying device 102, in particular being applied to the conveying device 102.

For this purpose, the receiving elements 110 include bearing surfaces 112 and support surfaces 114.

The conveying device 102 may for example take the form of a roller conveyor device or an overhead conveyor device.

In particular if the conveying facility 100 is part of a dip-coating facility (not illustrated), it may be provided for the conveying facility 100 to include a moving device 116.

By means of a moving device 116 of this kind, the workpiece 104, together with the receiving elements 110, may be rotated for example about a substantially horizontal axis, in particular in order to dip the workpiece 104 into a dip bath (not illustrated).

In particular, the workpiece 104, together with the receiving element 110, may be moved in a non-linear direction of movement 118 that is different from the conveying direction 106.

For releasably fixing the workpiece 104 on the moving device 116, a fastening device 120 is provided.

The fastening device 120 includes the receiving elements 110 by means of which the workpiece 104 is received, and locking devices 122, by means of which the receiving elements 110, together with the workpiece 104 arranged thereon, are releasably fixable on the moving device 116.

Figure 2:
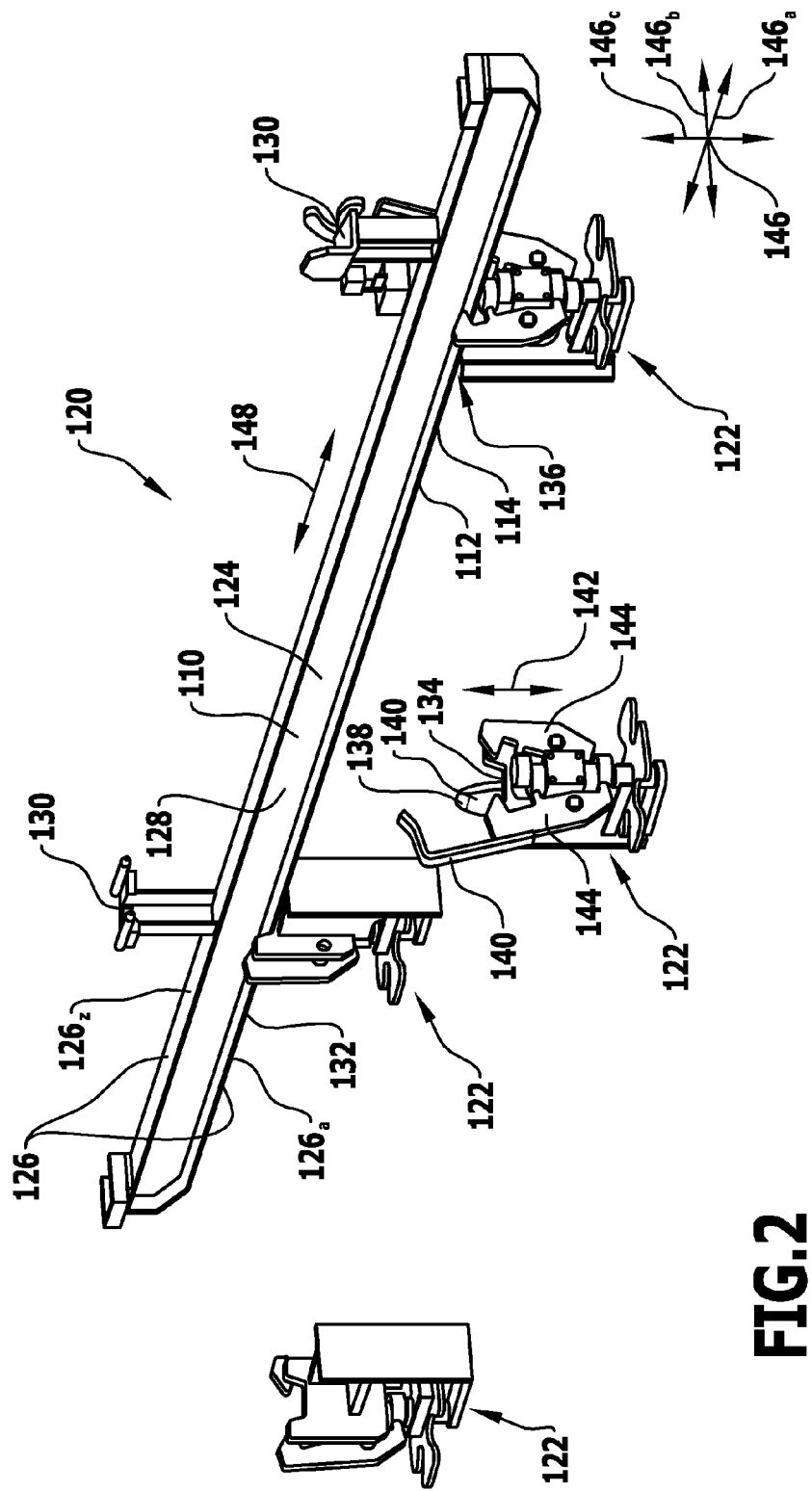
FIG. 2 shows a schematic perspective illustration of a fastening device of the conveying facility for fastening a workpiece to a moving device of the conveying facility, wherein locking devices of the fastening device are arranged in an open position.

As can be seen in particular from FIG. 2, the fastening device 120 includes a plurality of locking devices 122, for example two locking devices 122 per receiving element 110, which is to say a total of four locking devices 122.

The receiving elements 110 preferably include a substantially rail-shaped beam, in particular a double T-shaped beam 124.

A double T-shaped beam 124 of this kind includes two substantially mutually parallel flat end regions 126 and a web region 128 that connects the flat end regions 126 to one another.

At one flat end region 126z, facing the workpiece 104, of the double T-shaped beam 124 there are preferably arranged workpiece carrier elements 130 for fastening the workpiece 104 to the receiving element 110.

An upper surface 132, remote from the workpiece 104, of a flat end region 126a remote from the workpiece 104 forms the contact surface 112 or locating surface 114 for the receiving element 110 and the workpiece 104 arranged thereon to be applied to or to abut the conveying device 102.

The locking device 122 preferably acts on the flat end region 126a, remote from the workpiece 104, of the double T-shaped beam 124 in order to releasably fix the receiving element 110.

The receiving element 110 may for this purpose be supported in particular on a support surface 134 of the locking device 122.

In particular, the receiving element 110 may be supported on the support surface 134 of the locking device 122 by means of the bearing surface 114, in particular the upper surface 132.

For locking the receiving element 110 by means of the locking device 122, the flat end region 126a, remote from the workpiece 104, of the double T-shaped beam 124 has a recess 136.

A locking element 138, in particular a securing element 140, of the locking device 122 can engage in the recess 136.

The locking element 138 of the locking device 122 is in this case an immovable locking element 138 which is engageable with the receiving element 110 in that the receiving element 110 is placed on the locking device 122, or the locking device 122 is moved as a whole towards the receiving element 110.

In this arrangement, the immovable locking element 138 takes a form that is immovable in particular in relation to further elements of the locking device 122 that are fixed on the moving device 116.

The receiving element 110 and the locking device 122 are movable in relation to one another in particular in a positioning direction 142 in order to move the locking device 122 from a rest position, in which the receiving element 110 is not lockable to the locking device 122, into an operative position, in which the receiving element 110 is lockable by means of the locking device 122.

By means of the immovable locking element 138 and further locking elements 144, the receiving element 110 is fixable by means of the locking device 122 in respect of all three directions in space 146.

In particular, the receiving element 110 is fixable in a first direction in space 146a, a second direction in space 146b and a third direction in space 146c. The directions in space 146a, 146b and 146c are in this case oriented substantially perpendicular to one another.

The first direction in space 146a is preferably a longitudinal direction 148 of the double T-shaped beam 124.

By means of the immovable locking element 138, the receiving element 110 is releasably fixable preferably in respect of the first direction in space 146a and the second direction in space 146b.

When a plurality of locking devices 122 are used for a respective receiving element 110, it may be provided for not all the locking devices 122, for example only one locking device 122, to include an immovable locking element 138 of this kind (see FIG. 2).

By means of the further locking elements 144, which are in particular movable locking elements 144, the receiving element 110 is releasably fixable preferably in respect of the second direction in space 146b and the third direction in space 146c.

The third direction in space 146c is preferably substantially parallel to the positioning direction 142.

Figure 3:
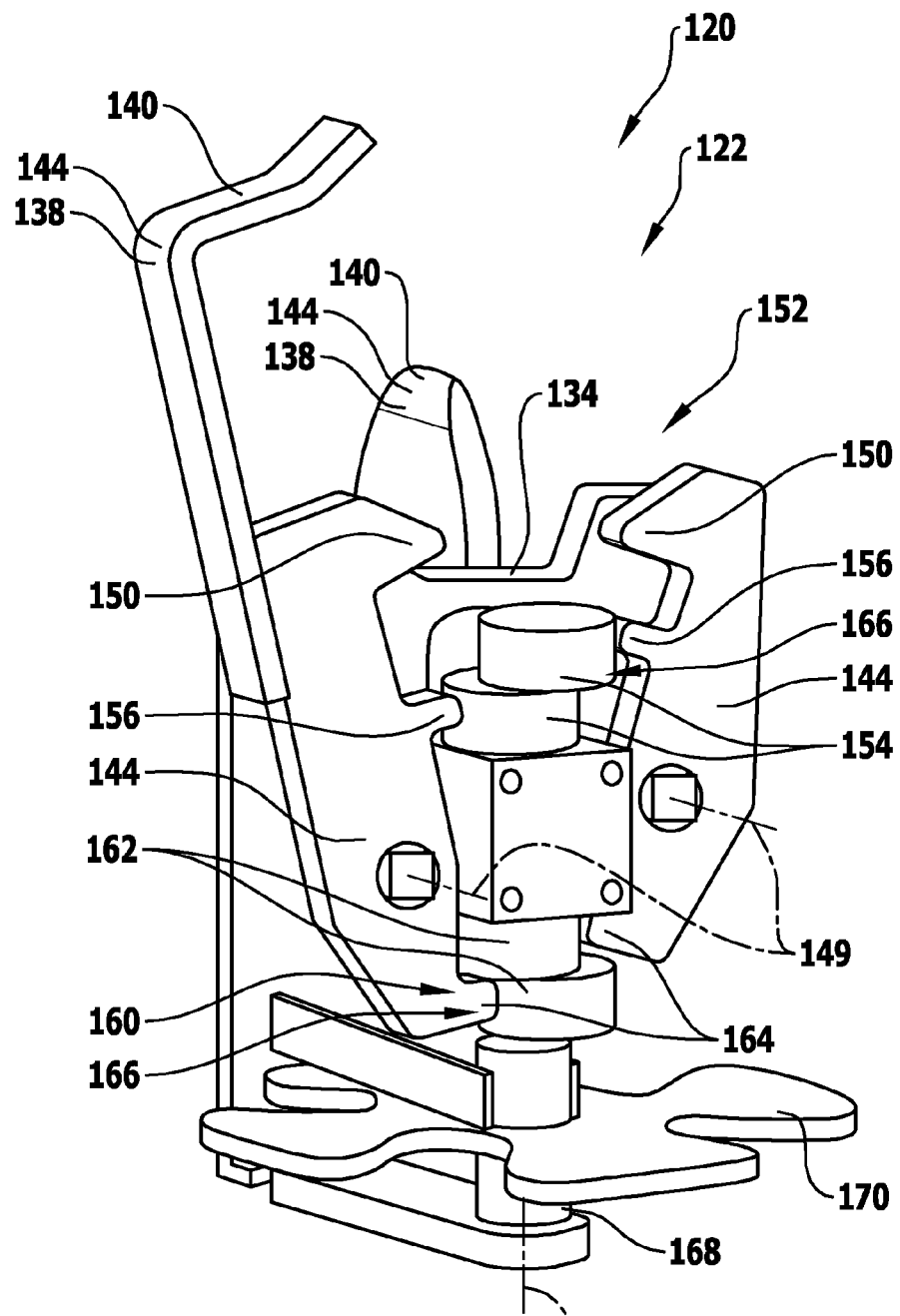
FIG. 3 shows a schematic perspective illustration of a locking device of the fastening device from FIG. 2, wherein the locking device is arranged in the open position.
Figure 4:
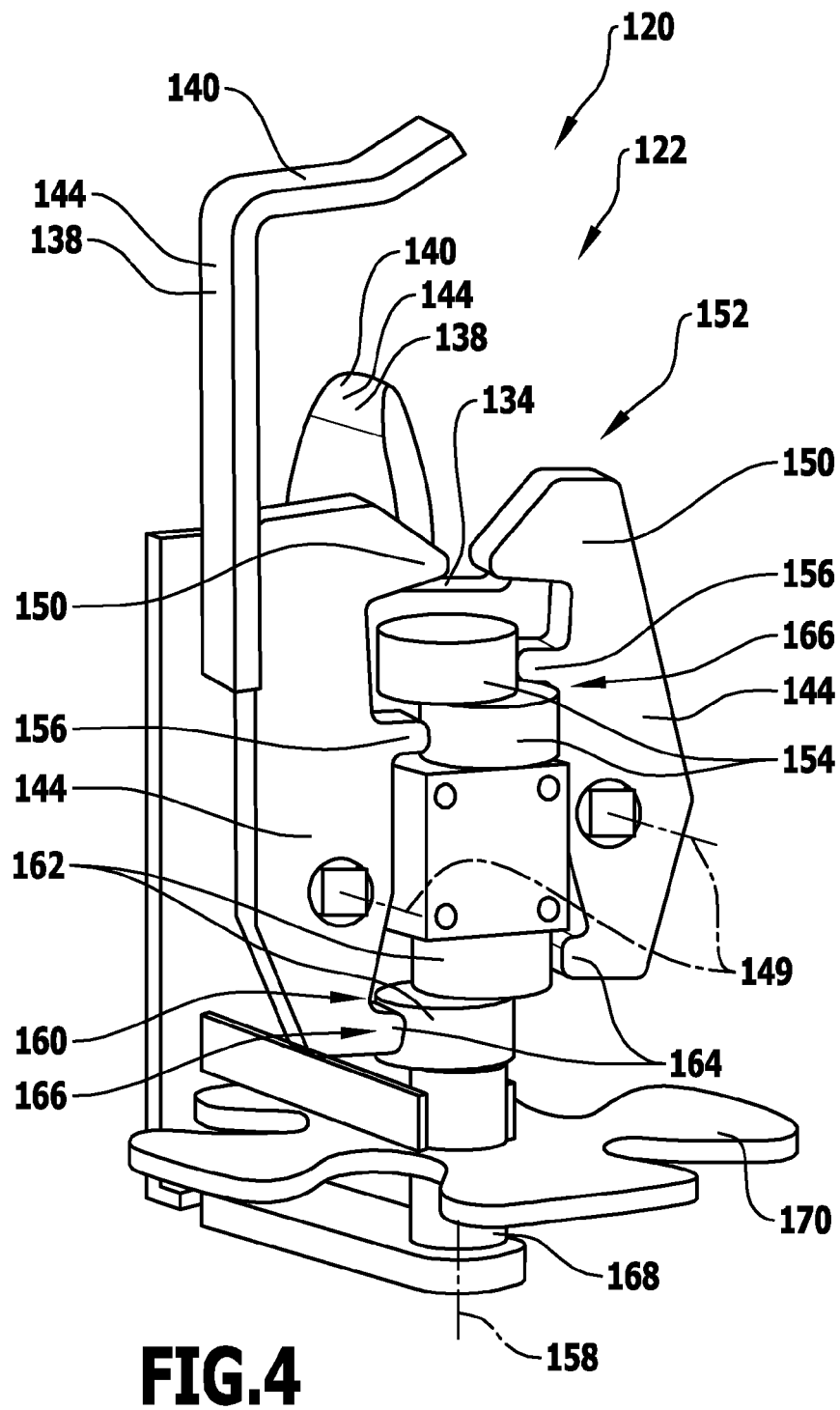
FIG. 4 shows a schematic perspective illustration of the locking device corresponding to FIG. 3, wherein the locking device is arranged in a locking position.

As can be seen in particular from FIGS. 3 and 4, the immovable locking element 138 which takes the form of a securing element 140 is in particular in the shape of a blade.

As an alternative or in addition thereto, it may be provided for an immovable locking element 138 which is functionally substantially similar to be in the shape of a bar.

The movable locking elements 144 are in particular rotatable or pivotal locking elements 144.

The locking elements 144 are for this purpose pivotal in particular about substantially mutually parallel and mutually spaced pivot axes 149.

The locking elements 144 have engaging portions 150 by means of which the locking elements 144 are engageable with the receiving element 110, in particular with the flat end region 146a, remote from the workpiece 104, of the double T-shaped beam 124 of the receiving element 110 (see in particular FIGS. 3 and 4).

The engaging portions 150 are movable, towards or away from one another, about the pivot axes 149 by the pivoting of the locking elements 144.

The locking device 122 includes an actuating device 152 for moving the engaging portions 150 and for pivoting the locking elements 144.

The actuating device 152 includes two actuating elements 154 that serve to actuate the locking elements 144.

The actuating elements 154 are eccentrically mounted actuating elements 154 against the peripheral surface whereof the locking elements 144 bear by means of actuating portions 156 of the locking elements 144.

Because of the eccentric mounting of the actuating elements 154, the actuating portions 156 of the locking elements 144 and thus also the engaging portions 150 of the locking elements 144 are moved towards or away from one another by a rotation of the actuating elements 154 about a rotational axis 158 of the actuating device 152.

To prevent undesired movement of the locking elements 144, the locking device 122 includes a blocking device 160.

The blocking device 160 includes two blocking elements 162.

The blocking elements 162 are eccentrically mounted blocking elements 162.

The eccentrically mounted blocking elements 162 are configured to be brought into contact with blocking portions 164 of the locking elements 144. In particular, the blocking portions 164 are in contact with peripheral surfaces of the blocking elements 162 of the blocking device 160.

As a result of the eccentric mounting of the blocking elements 162, the positions of the blocking portions 164 of the locking elements 144 and hence the spacing between the engaging portions 150 of the locking elements 144 may be influenced.

Both the actuating device 152 and the blocking device 160 take the form of an eccentric device 166.

In the embodiment of the locking device 122 illustrated in FIGS. 3 and 4, the actuating device 152 and the blocking device 160 form a common eccentric device 166 for actuating the locking elements 144.

The actuating elements 154 and the blocking elements 162 are arranged on a common shaft 168 of the locking device 122 and are rotatable about the common rotational axis 158.

In FIGS. 3 and 4, the actuating elements 154 and the actuating portions 156 of the locking elements 144 are illustrated separately from the blocking elements 162 and the blocking portions 164 of the locking elements 144.

Depending on the position of the locking elements 144, however, the actuating elements 154 also function as blocking elements 162, and the blocking elements 162 also function as actuating elements 154.

Accordingly, the actuating portions 156 of the locking elements 144 function as blocking portions 164, and the blocking portions 164 of the locking elements 144 function as actuating portions 156.

The actuating element 154 that is associated with one locking element 144, and the blocking element 162 that is also associated with this locking element 144, are arranged offset from one another, in particular offset by 180°, in respect of rotation about the rotational axis 158. On rotation of the actuating elements 154 and the blocking elements 162 about the rotational axis 158, for example the eccentrically mounted element that is designated as the actuating element 154 in FIGS. 3 and 4 is thus moved away from the portion of a locking element 144 that is designated as actuating portion 156 in FIGS. 3 and 4. At the same time, the associated blocking element 162 moves towards the blocking portion 164 of the same locking element 144. As a result, the locking element 144 is pivoted about the pivot axis 149.

Preferably, the locking element 144 always bears against the actuating element 154 by means of the actuating portion 156 and/or always bears against the blocking element 162 by means of the blocking portion 164. The locking element 144 is preferably moved about the rotational axis 158 by rotation of the actuating element 154 and the blocking element 162.

The locking element 122 includes a drive element 170 by means of which the actuating elements 154 and the blocking elements 162 are rotatable about the rotational axis 158.

The locking elements 144 may be moved, by rotation of the drive element 170, which is also preferably arranged on the common shaft 168, from the open position illustrated in FIG. 3 into the locking position illustrated in FIG. 4, and/or from the locking position illustrated in FIG. 4 into the open position illustrated in FIG. 3.

Figure 5:
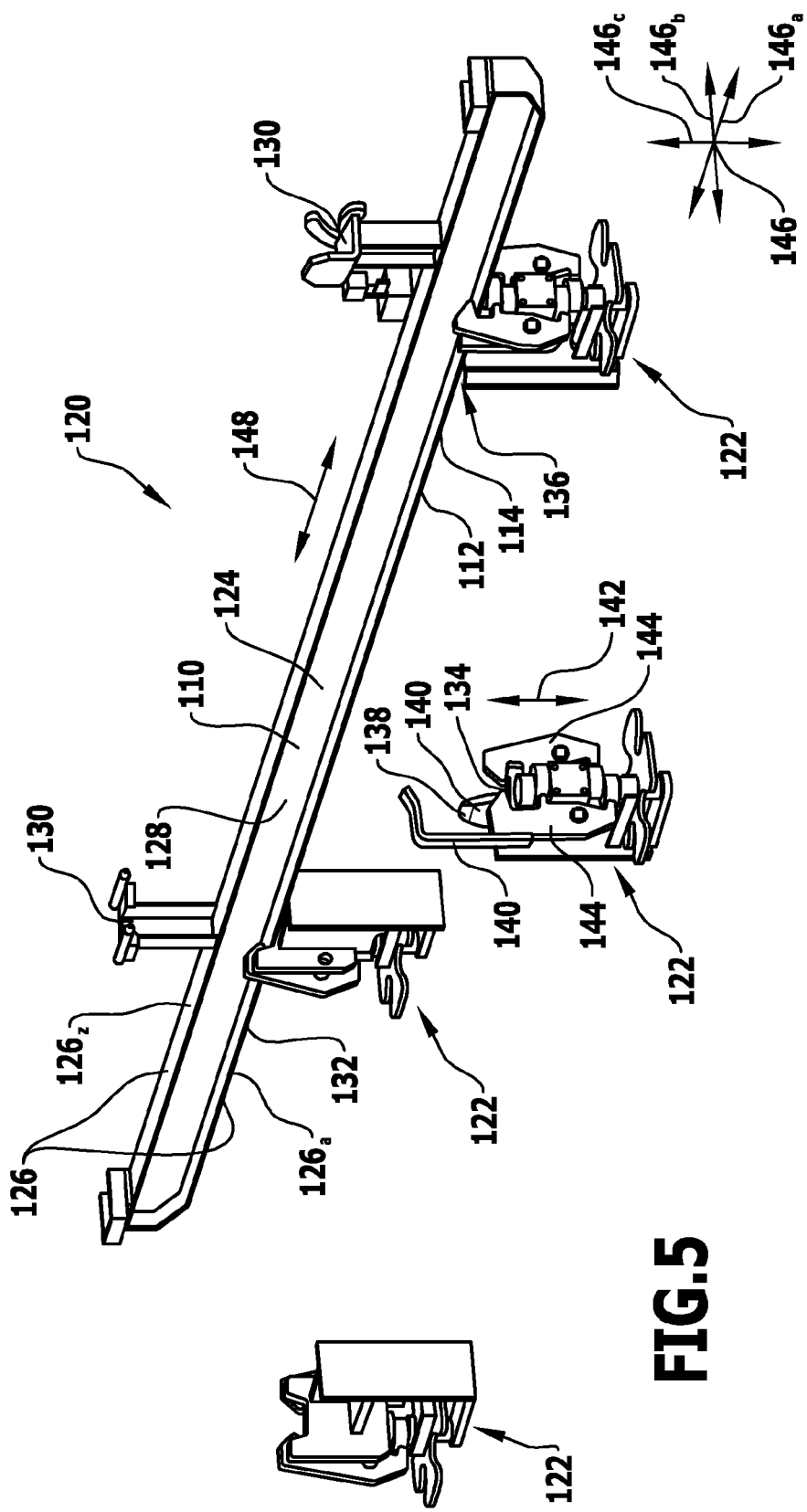
FIG. 5 shows a schematic perspective illustration of the fastening device corresponding to FIG. 2, wherein the locking devices are arranged in the locking position.

As can be seen in particular from FIGS. 4 and 5, in the locking position the locking elements 144 engage by means of the engaging portions 150 of the locking elements 144 with the flat end regions 126a, remote from the workpiece 104, of the double T-shaped beam 124 of the receiving element 110.

Preferably, there is a positively engaging connection between a receiving element 110 and a locking device 122.

As an additional securing measure, it may be provided for a locking element 144, in particular one of the movable locking elements 144, to include an additional securing element 140 that, in the locking position of the locking device 122 illustrated in FIG. 5, engages over the flat end region 126z facing the workpiece 104.

The conveying facility 100 described above functions as follows:

A workpiece 104 that is received by means of two receiving elements 110 is conveyed in the conveying direction 106 by means of the conveying device 102.

In particular, the workpiece 104 is fed to a dip-coating facility (not illustrated).

For coating the workpiece 104, the workpiece 104 is first fixed on the moving device 116.

For this purpose, the fastening device 120, which includes the locking devices 122, is provided.

For fixing the workpiece 104 on the moving device 116, the receiving elements 110 engage with the locking devices 122.

In particular, the receiving elements 110 are supported on the support surfaces 134 of the locking device 122 in the positioning direction 142, and/or the locking devices 122 are moved towards the receiving elements 110 in the positioning direction 142.

The locking devices 122 act in particular on the flat end regions 126a, remote from the workpiece 104, of the double T-shaped beams 124 of the receiving elements 110.

In particular, immovable locking elements 138 engage with recesses 136 in the receiving elements 110 in order to fix the receiving elements 110 in respect of the first direction in space 146a and the second direction in space 146b, in relation to the locking device 122 and hence also in relation to the moving device 116.

In principle, it may be provided for each locking device 122 to include an immovable locking element 138 of this kind.

However, it may also be provided for only individual locking devices 122 to include an immovable locking element 138 of this kind (see in particular FIG. 2).

For locking the receiving elements 110 in the third direction in space 146c, the drive element 170 is rotated for example by an actuator (not illustrated) or a drive motor (not illustrated).

As a result, the eccentrically mounted actuating elements 154 of the actuating device 152 and the eccentrically mounted blocking elements 162 of the blocking device 160 are also rotated.

Rotation of the actuating elements 154 and the blocking elements 162 results in pivoting of the locking elements 144 about the pivot axes 149.

In particular, as a result the locking elements 144 are moved from the open position illustrated in FIG. 3 into the locking position illustrated in FIG. 4.

During this, the engaging portions 150 of the locking elements 144 are moved towards one another and finally engage behind the flat end regions 126a, remote from the workpiece 104, of the receiving elements 110, in the locking position illustrated in FIG. 4.

As soon as the locking devices 122 are in the locking position, the receiving elements 110 and the workpiece 104 arranged thereon may be moved in all directions in space 146, by means of the moving device 116.

In particular, the workpiece 104 may be moved in the direction of movement 118, in particular being rotated about a horizontal axis, in order to be dipped into a dip bath of the dip-coating facility and removed from the dip bath again.

For releasing the connection between the receiving element 110 and the moving device 116, the drive element 170 is rotated onwards about the rotational axis 158, for example by means of the drive motor or actuator (not illustrated). This moves the engaging portions 150 of the locking elements 144 apart and disengages them from the flat end regions 126a, remote from the workpiece 104, of the receiving elements 110.

The receiving elements 110 and the workpiece 104 arranged thereon can then be removed from the locking devices 122 and conveyed onwards, for example by means of the conveying device 102.

Figure 6:
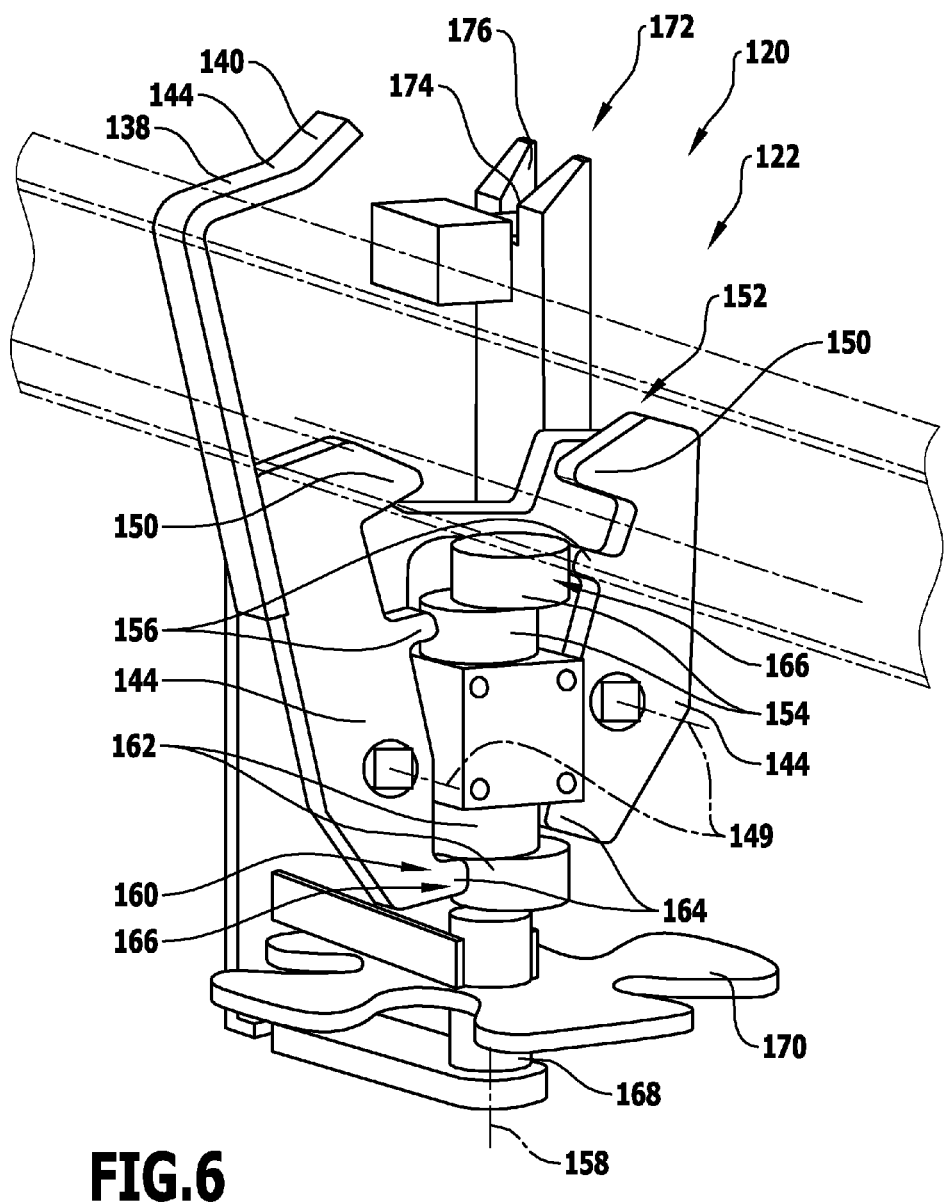
FIG. 6 shows a schematic perspective illustration of an alternative embodiment of a locking device.

An alternative embodiment of a fastening device 120, illustrated in FIG. 6, differs from the first embodiment illustrated in FIGS. 1 to 5 substantially in that the receiving elements 110 are fixed on the locking devices 122 in respect of the first direction in space 146*a*, in particular the longitudinal direction of the double T-shaped beams 124 of the receiving elements 110, by means of a bar device 172.

The bar device 172 includes a bar 174, which is arranged for example on a flat end region 126*z*, facing the workpiece 104, of the receiving element 110, and a bar receptacle 176, which is arranged for example on a locking device 122.

In particular as a result of a relative movement between the receiving element 110 and the locking device 122 in the positioning direction 142, the bar 174 and the bar receptacle 176 may be engaged with and disengaged from one another.

Otherwise, the embodiment illustrated in FIG. 6 of the fastening device 120 corresponds, as regards its structure and functioning, to the embodiment illustrated in FIGS. 1 to 5, so in this respect reference is made to the description thereof above.

Figure 7:
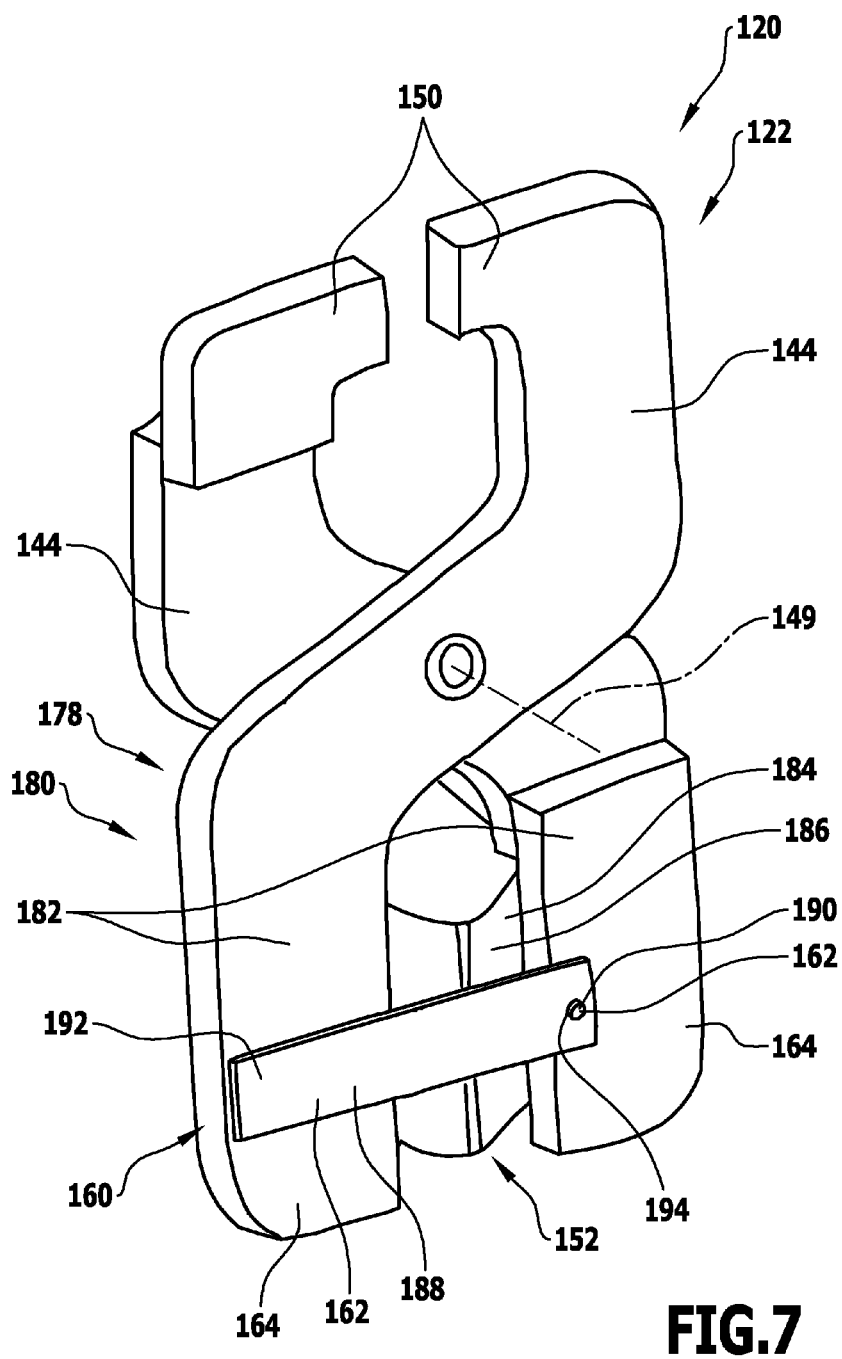
FIG. 7 shows a schematic perspective illustration of a further alternative embodiment of a locking device, wherein the locking device is arranged in a locking position.
Figure 8:
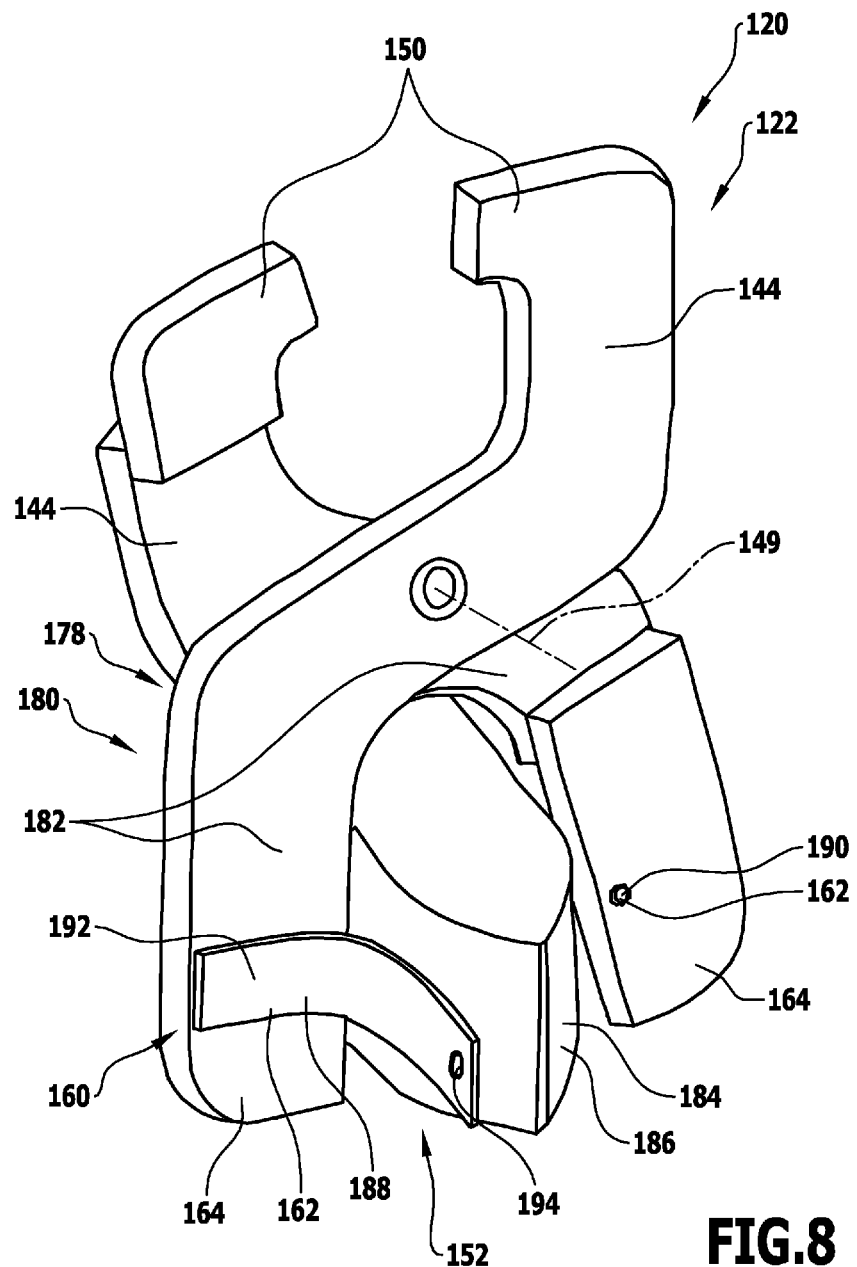
FIG. 8 shows a schematic perspective illustration of the locking device from FIG. 7, wherein the locking device is arranged in an open position.

An alternative embodiment of the fastening device 120, illustrated in FIGS. 7 and 8, differs from the embodiment illustrated in FIGS. 1 to 5 substantially in that the actuating device 152 for actuating the locking elements 144 includes a cam device 178, in particular a guideway device 180.

The locking elements 144 are formed by scissor elements 182 that are pivotal in relation to one another about a centrally arranged common pivot axis 149.

In this arrangement, the locking elements 144 each include an engaging portion 150 and a blocking portion 164, wherein the engaging portion 150 and the respective blocking portion 164 of each locking element 144 are arranged on mutually opposite sides of the pivot axis 149.

The scissor elements 182 are arranged to be substantially X-shaped, wherein the engaging portions 150 and the blocking portions 164 are in each case arranged opposite one another.

Between the engaging portions 150, in particular a receiving element 110 may be received.

By means of the actuating device 152, the fastening device 120, in particular the locking device 122, may be moved from the locking position illustrated in FIG. 7 into the open position illustrated in FIG. 8, and/or from the open position into the locking position.

For this purpose, the actuating device 152 includes in particular at least one cam element 184.

The cam element 184 takes the form for example of a bolt 186.

The cam element 184 may in particular be introduced between the blocking portions 164 of the locking elements 144 in order to push them apart.

As a result, at the same time the engaging portions 150 of the locking elements 144 are moved apart and thus the fastening device 120, in particular the locking device 122, is moved from the locking position into the open position.

By means of the cam element 184 in the form of a bolt 186, moreover a locking device 188 is unlocked.

The locking device 188 forms in particular a blocking device 160.

The locking device 188 includes two blocking elements 162, wherein one blocking element takes the form for example of a projection 190 and a further blocking element 162 takes the form of a spring element 192.

The spring element 192 includes in particular an opening 194 in which the projection 190 is engageable.

The blocking elements 162 are arranged on the blocking portions 164 of mutually different locking elements 144.

In this arrangement, the spring element 192 for example extends, in the locking position illustrated in FIG. 7, from the blocking portion 164 of the one locking element 144 to the blocking portion 164 of the further locking element 144 and, in the locking position, engages with the projection 190.

When the spring element 192 engages with the projection 190, the bolting device 188 that forms the blocking device 160 is bolted, with the result that neither the blocking portions 164 nor the engaging portions 150 are movable away from one another.

By means of the cam element 184, the spring element 192 can be moved away from the one blocking portion 164 of the one locking element 144 and disengaged from the projection 190.

The locking device 188 is then unlocked.

By providing a suitable shape for the cam element 184, in particular by forming the cam element 184 as a bolt 186, it is possible in a subsequent step to push the blocking portions 164 of the locking elements 144 apart in order to move the locking device 122 into the open position.

The cam element 184 in the form of a bolt 186 is in particular an internal cam that acts between the blocking portions 164 of the locking elements 144.

By means of further cam elements 184 (not illustrated) that form for example an external cam, the locking device 122 may preferably be moved from the open position illustrated in FIG. 8 back into the locking position illustrated in FIG. 7.

As a result of this, the spring element 192, which is formed for example from spring steel, comes back into engagement with the projection 190, preferably automatically, with the result that the locking device 188 is locked automatically.

Otherwise, the embodiment illustrated in FIGS. 7 and 8 of the fastening device 120 corresponds, as regards its structure and functioning, to the embodiment illustrated in FIGS. 1 to 5, so in this respect reference is made to the description thereof above.

Because, in all the embodiments of the fastening device 120, a receiving element 110 for receiving the workpiece 104 and a locking device 122 for releasably fixing the receiving element 110 on the moving device 116 are provided, the fastening device 120 has a small space requirement and at once enables secure fastening of the workpiece 104 to the moving device 116.

The invention claimed is:

1. A fastening device for fastening a workpiece to a moving device for moving the workpiece, wherein the fastening device includes a receiving element for receiving the workpiece and a locking device for releasably fixing the receiving element on the moving device, wherein the locking device includes an actuating device that includes an eccentric device, for actuating a locking element of the locking device;

wherein the eccentric device includes eccentrically mounted actuating elements and eccentrically mounted blocking elements, which are arranged on a common shaft of the locking device and are rotatable about a common rotational axis in order to pivot the locking element about a pivot axis.

2. The fastening device according to claim 1, wherein, for conveying the receiving element and a workpiece arranged thereon in a conveying direction by means of a bearing surface, the receiving element is configured to bear against a conveying device, and in that, for releasably fixing the receiving element on the moving device, the locking device is engageable with the receiving element by a movement in a positioning direction of the locking device that is oriented substantially perpendicular to the bearing surface of the receiving element.

3. The fastening device according to claim 1, wherein the fastening device includes at least two receiving elements and at least two locking devices, wherein the at least two receiving elements are connected to one another by means of the workpiece, in particular being connected to one another exclusively by means of the workpiece.

4. The fastening device according to claim 3, wherein a respective receiving element is fixable in all three directions in space in relation to the moving device by means of in each case at least one locking device.

5. The fastening device according to claim 1, wherein the receiving element takes a substantially rail-shaped form, in particular taking the form of a double T-shaped beam.

6. The fastening device according to claim 1, wherein the locking device includes a movable locking element which is engageable behind at least one portion of the receiving element in a locking position of the locking device, and/or in that the locking device includes a locking element which is engageable with an indentation, opening and/or recess in the receiving element.

7. The fastening device according to claim 1, wherein the locking device includes a pivotal and/or linearly movable locking element which is engageable with the receiving element, and/or in that the locking device includes a locking element that is pivotal about an axis that runs substantially perpendicular to a positioning direction of the locking device.

8. The fastening device according to claim 1, wherein the locking device includes an actuating device for actuating a locking element of the locking device, wherein the actuating device includes an actuating element for actuating the locking element, by means of which the locking element is optionally movable into a locking position, in which the locking element engages with the receiving element, and into an open position, in which the receiving element is movable in relation to the locking element.

9. The fastening device according to claim 1, wherein the locking device includes a blocking device by means of which there is blockable an undesired movement of the locking element from a locking position, in which the locking element engages with the receiving element, into an open position, in which the receiving element is movable in relation to the locking element, and/or from the open position into the locking position.

10. The fastening device according to claim 9, wherein the blocking device includes an eccentric device.

11. The fastening device according to claim 9, wherein the actuating device and the blocking device are formed by a common eccentric device.

12. The fastening device according to claim 1, wherein at least one eccentrically mounted actuating element, at least one eccentrically mounted blocking element and/or a drive element, for driving the actuating device and/or the blocking device, are arranged on a common shaft.

13. The fastening device according to claim 1, wherein the locking device includes at least two locking elements,
wherein the receiving element is releasably fixable in relation to the moving device by means of at least one locking element in respect of a first direction in space and in respect of a second direction in space that is substantially perpendicular to the first direction in space, and
wherein the receiving element is releasably fixable in relation to the moving device by means of at least one further locking element in respect of a third direction in space that is substantially perpendicular to the first direction in space and the second direction in space.

14. A conveying facility for conveying workpieces, including:
a fastening device for fastening a workpiece to a moving device for moving the workpiece, wherein the fastening device includes a receiving element for receiving the workpiece and a locking device for releasably fixing the receiving element on the moving device, wherein the locking device includes an actuating device that includes an eccentric device, for actuating a locking element of the locking device;
wherein the eccentric device includes eccentrically mounted actuating elements and eccentrically mounted blocking elements, which are arranged on a common shaft of the locking device and are rotatable about a common rotational axis in order to pivot the locking element about a pivot axis;
the moving device for moving the workpiece; and
a conveying device for conveying the workpiece.

15. A locking device, including a locking element and an actuating device that includes an eccentric device, for actuating the locking element, wherein the locking element is movable, by means of the actuating device, optionally into a locking position, in which the locking element engages with an element to be locked, and into an open position, in which the element to be locked is movable in relation to the locking element,
wherein the eccentric device includes eccentrically mounted actuating elements and eccentrically mounted blocking elements, which are arranged on a common shaft of the locking device and are rotatable about a common rotational axis in order to pivot the locking element about a pivot axis.

\* \* \* \* \*

UNITED STATES PATENT AND TRADEMARK OFFICE
CERTIFICATE OF CORRECTION

PATENT NO. : 9,957,005 B2  
APPLICATION NO. : 14/890730  
DATED : May 1, 2018  
INVENTOR(S) : Kincses et al.

Page 1 of 1

It is certified that error appears in the above-identified patent and that said Letters Patent is hereby corrected as shown below:

On the Title Page

Item (71) "Applicant:" the applicant name was updated, it should appear as follows:
Applicant: Dürr Systems AG, Bietigheim-Bissingen (DE)

In the Specification

At Column 3, Line 18, the text "a double T-s shaped beam," should be changed to -- a double T-shaped beam, --

At Column 7, Line 12, the text "a drive element is preferably is provided." should be changed to -- a drive element is preferably provided. --

In the Claims

At Column 16, Claim 14, Line 24, the text "workpiece and a locking device for releasablv fixing" should be changed to -- workpiece and a locking device for releasably fixing --

Signed and Sealed this  
Thirtieth Day of October, 2018

Andrei Iancu  
*Director of the United States Patent and Trademark Office*